United States Patent
Scaramucci

[15] 3,675,888
[45] July 11, 1972

[54] APPARATUS FOR MOLDING A SEAT IN A VALVE BODY

[72] Inventor: Domer Scaramucci, 3245 S. Hattie, Oklahoma City, Okla. 73129

[22] Filed: Feb. 24, 1970

[21] Appl. No.: 13,622

[52] U.S. Cl. .............................249/57, 18/DIG. 47, 249/95, 251/306
[51] Int. Cl. ......................................B22c 9/24, B29d 23/00
[58] Field of Search ...................249/57, 95, 83; 18/36, 42 R, 18/DIG. 47; 251/306

[56] References Cited

UNITED STATES PATENTS

| | | | |
|---|---|---|---|
| 2,724,864 | 11/1955 | Krotz | 249/83 X |
| 3,050,781 | 8/1962 | Killian | 18/36 X |
| 3,100,500 | 8/1963 | Stillwagon | 251/306 X |
| 278,321 | 5/1883 | Diss | 249/57 |

FOREIGN PATENTS OR APPLICATIONS 572,335  3/1959  Canada...................................249/95

*Primary Examiner*—Robert D. Baldwin
*Attorney*—Dunlap, Laney, Hessin & Dougherty

[57] ABSTRACT

A method and apparatus for molding an elastomeric seat and stem seal in a valve body, wherein a pair of mold sections, each mold section having a cavity formed therein, are secured about a valve body having the valve member rotatably supported therein by at least one stem journaled in a mating aperture in the valve body. The cavities in the mold sections are shaped to cooperate with the valve body to define a space therebetween wherein the uncured elastomeric material is to be forced, the space being shaped to surround a portion of the stem and to define the limits of the elastomeric seat and stem seal.

10 Claims, 10 Drawing Figures

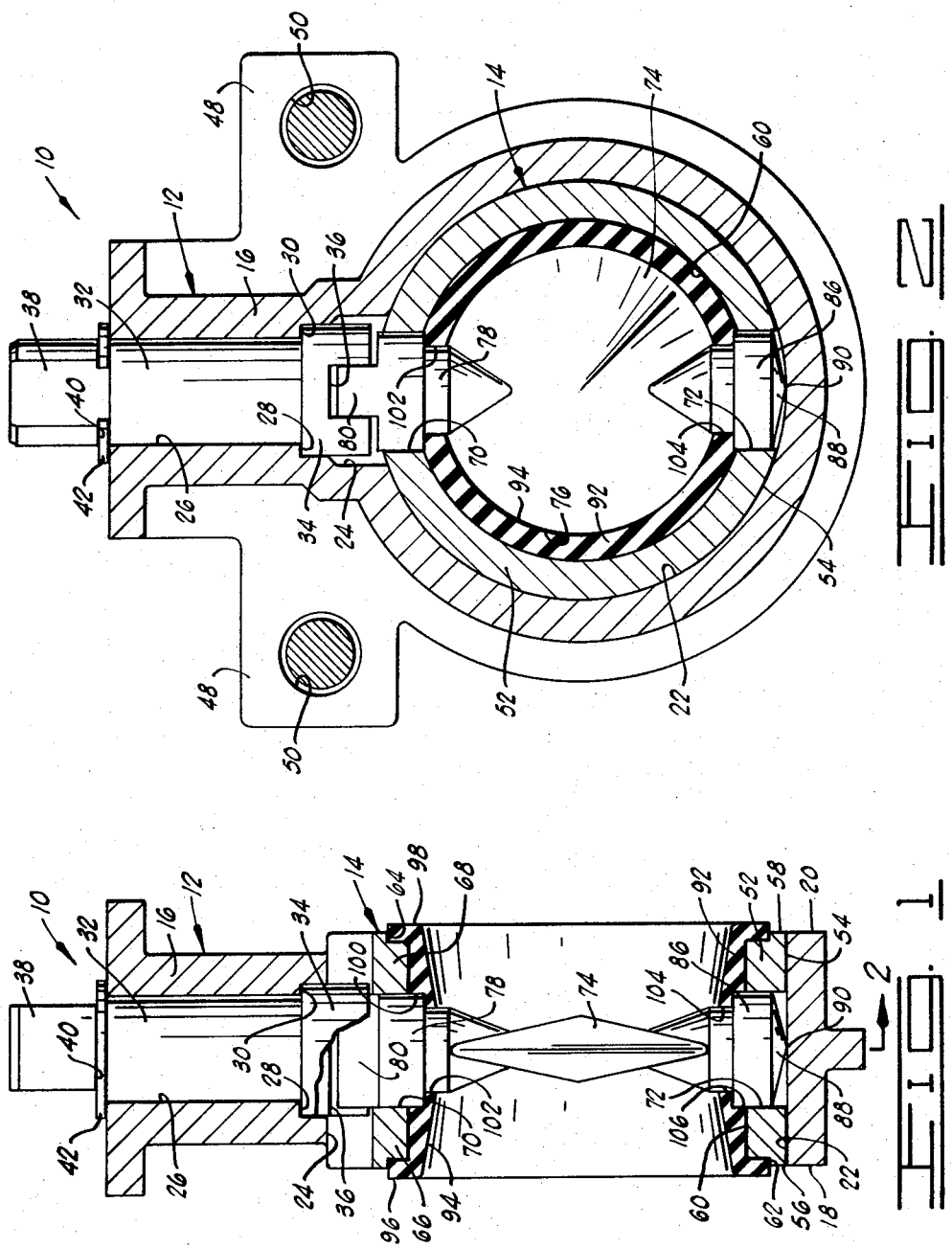

INVENTOR
DOMER SCARAMUCCI

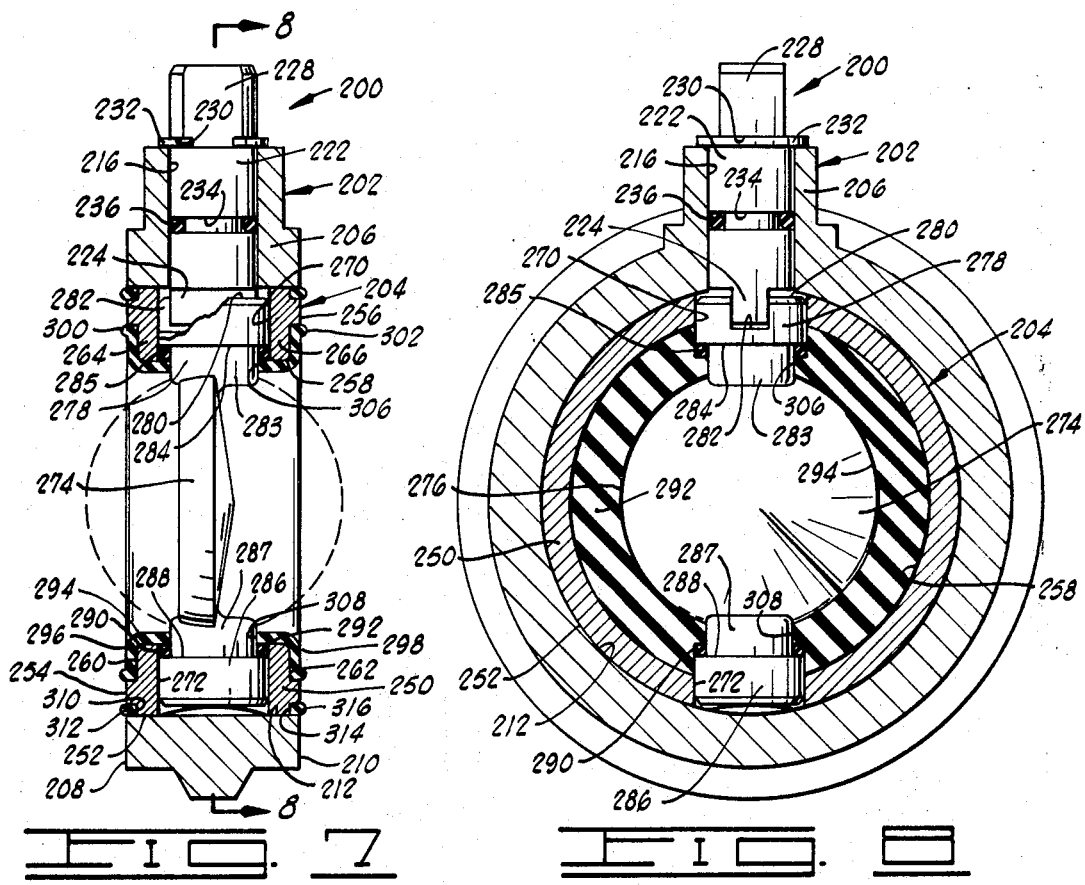
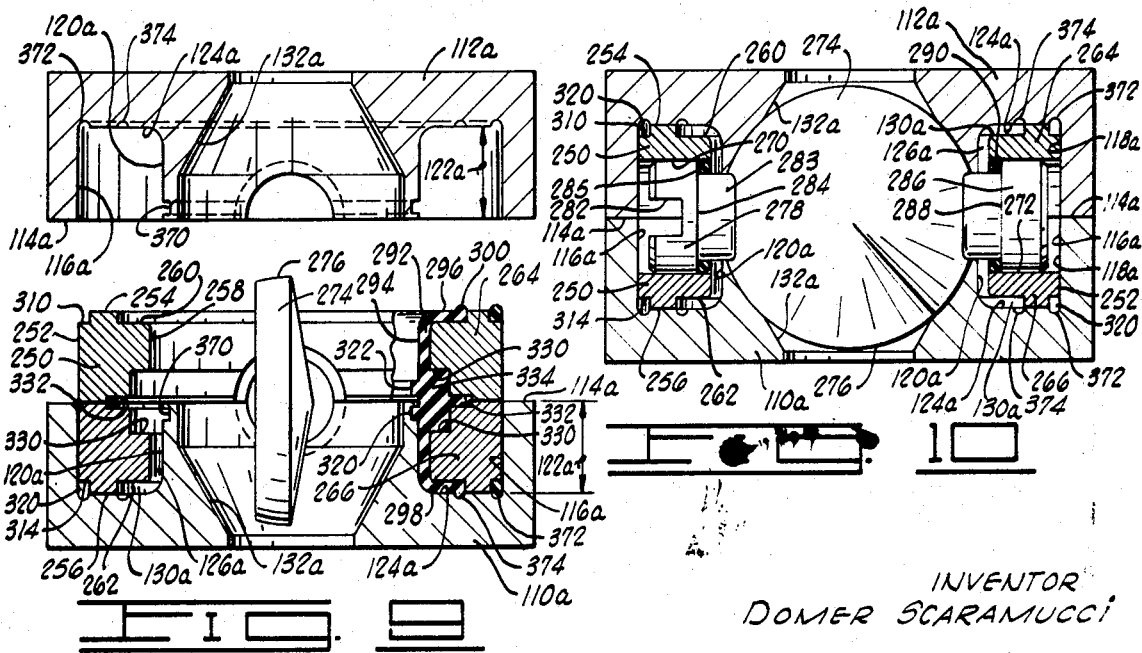

APPARATUS FOR MOLDING A SEAT IN A VALVE BODY

BACKGROUND OF THE INVENTION

1. Field of the Invention

This invention relates generally to improvements in apparatus for molding an elastomeric seat in a valve body, and more particularly, but not by way of limitation, to apparatus for molding an elastomeric seat in a valve body having the valve member and valve stems rotatably disposed therein.

2. Description of the Prior Art

In the past there have been some limited methods proposed for molding a resilient seat in a valve body. In most of these methods, the various mold sections were oriented with respect to the valve body, and some of the mold sections were inserted through the bore of the valve body.

Those mold sections inserted in the bore of the valve body were shaped and disposed to cooperate with the valve body to define the limits of the resilient seat, and were generally secured in position therein by bolts or pins which extended through the valve stem openings in the valve body. The seat was thus formed about these bolts, thereby providing openings in the seat shaped to receive the valve stems in the completed valve assembly. Since these openings were usually sized smaller than the stems so that a fluid tight seal might be formed therebetween, the insertion of the valve stems through these openings easily results in the damage or destruction of a portion of the seat adjacent the openings, thereby resulting in a loss of sealing integrity about the valve stems.

The machined surfaces in the valve body were adapted to locate the internal mold sections, and thus determine the orientation of the resilient seat about the bore of the valve body. Therefore, if the machined surfaces were not accurately formed with respect to the bore through the valve body, the seat formed therein would be off-center with respect to the bore in the valve body. The result of such off-centering was an improper seating of the valve member, and thus a loss of sealing integrity.

SUMMARY OF THE INVENTION

An object of the invention is to provide apparatus wherein an elastomeric seat can be molded in a valve body having the valve member and stems in place.

Another object of the invention is to provide apparatus for molding an elastomeric seat in a valve body wherein the inner periphery of the seat is uniformly maintained with respect to the valve member.

One other object of the invention is to provide a more economical and efficient apparatus for molding an elastomeric seat and stem seals in a valve body.

Other objects and advantages of the invention will be evident from the following detailed description when read in conjunction with the accompanying drawings which illustrate various embodiments of the invention.

BRIEF DESCRIPTION OF THE DRAWINGS

FIG. 1 is a sectional view of a valve assembly.

FIG. 2 is a sectional view of the valve assembly of FIG. 1, taken substantially along the lines 2—2 of FIG. 1.

FIG. 7 is a sectional view of another valve assembly.

FIG. 8 is a sectional view of the valve assembly of FIG. 7, taken substantially along the lines 8—8 of FIG. 7.

FIG. 9 is an exploded, sectional view showing modified first and second mold sections, with the valve body and the valve member of FIG. 7 assembled in the first mold section, and including a fragmentary view of a portion of the valve body having the seat molded therein.

FIG. 10 is a sectional view of the first and the second mold sections of FIG. 9 assembled about the valve body and the valve member of FIG. 7.

DESCRIPTION OF THE PREFERRED EMBODIMENT

Figure 3:
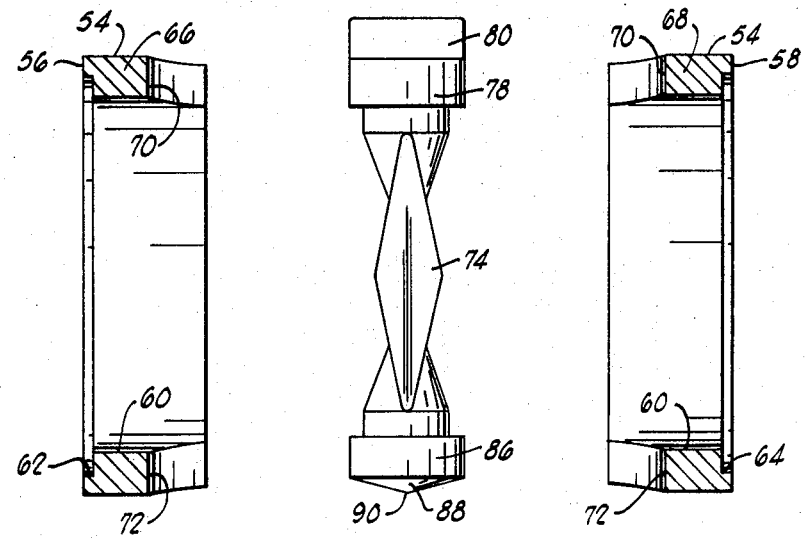
FIG. 3 is an exploded view showing the valve body and the disc valve member of the valve assembly of FIG. 1.

The apparatus of the present invention is utilized to form an elastomeric seat in a valve body, having the valve member and associated valve stems rotatably supported in place in the valve body. For the purpose of clarity of description the apparatus may best be described with reference to molding a seat in a particular valve assembly, as will be described in detail below.

Referring to the drawings in detail, and to FIGS. 1 and 2 in particular, shown therein and designated by the general reference character 10, is a valve assembly basically comprising a housing unit 12 and a valve unit 14.

The housing unit 12 includes a housing 16 having opposite end faces 18 and 20 and a bore 22 extending therethrough. A slot 24 is formed in the housing 16 along the top of the bore 22 to accommodate the upper portion of a second valve stem as the valve unit 14 is slid lengthwise into the housing unit 12. An aperture 26 extends transversely through the housing 16 intersecting the slot 24. The aperture 26 is provided with a counterbore 28 adjacent its intersection with the slot 24 of the housing 16, thereby providing a downwardly facing surface 30 in the housing 16.

A first valve stem 32 is journaled in the housing 16 and extends transversely through the aperture 26. The first valve stem 32 includes a lower flange portion 34 that engages the downwardly facing surface 30 in the housing 16 to limit the upward movement of the first valve stem 32 in the aperture 26. A slot 36 is formed in the flange portion 34 of the first valve stem 32, for reasons which will be made more apparent below.

An uppermost end portion 38 of the first valve stem 32 is adapted to receive and cooperate with a valve handle or other suitable operator (not shown) for turning the valve stem 32 of the housing unit 12, and thereby rotating a valve member from a fully open to a fully closed position. As well known in the art, various forms of valve handles and connections may be utilized, and therefore no further description is required herein.

A circumferential groove 40 is formed in a portion of the first valve stem 32 and a retaining ring 42 is disposed in the groove 40. The retaining ring 42 is sized and disposed to engage a portion of the housing 16 to limit the downward movement of the valve stem 32 in the aperture 26.

A pair of flanges 48 extend outwardly from the housing 16 of the housing unit 12, as shown more clearly in FIG. 2. A bolt hole 50 extends through each flange 48.

The valve unit 14 includes a valve body 52 having an outer periphery 54, sized to slidingly fit into the bore 22 of the housing 16, and opposite end faces 56 and 58. A bore 60 extends through the valve body 52, intersecting the end faces 56 and 58. Counterbores 62 and 64 are formed in the valve body 52, generally adjacent the end faces 56 and 58, respectively.

As shown more clearly in FIG. 3, the valve body 52 is split along a vertical centerline thereof, thereby providing a pair of side body components 66 and 68. Each body component 66 and 68 includes a portion of an upper aperture 70 formed in the end face thereof, opposite the end face 56 or 58 respectively. Each upper aperture portion 70 is sized such that in the assembled position, as shown in FIGS. 1 and 2, the upper aperture portions 70 cooperate to encompass a portion of a second valve stem. Each body component 66 and 68 also include a portion of a lower aperture 72 formed in the end face thereof, opposite the end face 56 or 58, respectively. Each lower aperture portion 72 is sized such that in the assembled position, as shown in FIGS. 1 and 2, the lower aperture portions 72 cooperate to encompass a portion of a third valve stem.

A disc or butterfly valve member 74, having an outer periphery 76, is rotatably disposed in the bore 60 of the valve body 52. A second valve stem 78 extends upwardly from the disc 74, through the upper aperture formed by the aperture portions 70 in the valve body 52. A rectangularly shaped end 80 is formed on the uppermost end portion of the second valve stem 78, and is shaped to interconnectingly fit into the slot 36 of the first valve stem 32.

A third valve stem 86 extends downwardly from the disc 74, through the aperture formed by the lower aperture portions 72 of the valve body 52. A conical shaped portion 88 is formed on the outer end of the third valve stem 86, and is provided with an end point or apex 90. In an assembled position when the valve unit 14 is inserted in the housing unit 12, of the apex 90 of the third valve stem 86 is in engagement with the housing 16. In a preferred form and as shown in FIGS. 1 and 2, the second and third valve stems 78 and 86 are formed integrally with the disc 74.

An elastomeric seat member 92, preferably of a rubber or a rubber composition, having an inner periphery 94 and opposite ends 96 and 98, is bonded to the walls of the bore 60 and to the walls of the counterbores 62 and 64 of the valve body 52, and forms the valve seat for the valve unit 14. It may be observed in FIG. 1, that the ends 96 and 98 of the elastomeric seat 92 project axially outward beyond the ends 56 and 58, respectively, of the valve body 52.

The elastomeric seat 92 surrounds the second and third valve stems 78 and 86, and is provided with surfaces 100, 102, 104 and 106, which sealingly engage the second and third valve stems 78 and 86. The inner periphery 94 of the elastomeric seat 92 is tapered inwardly from both ends 96 and 98 thereof, to a position wherein the inner periphery of the central portion thereof is of a smaller diameter than the diameter formed by the outer periphery 76 of the disc 74. Thus, when the disc 74 is in the closed position, as shown in FIGS. 1 and 2, the outer periphery 76 of the disc 74 will seat on a central portion of the elastomeric seat 92 with an interference fit being established therebetween.

The valve assembly 10 is provided such that it may be installed between a pair of flanges (not shown). When the valve assembly 10 is disposed between two flanges it will be held in an assembled relationship by a plurality of bolts. Two of the bolts will extend through the flanges and through the bolt holes 50 provided therefore in the housing 16, and the remaining bolts will extend about the outer periphery of the housing 16 of the housing unit 12. The valve assembly 10 will then be secured in position by a plurality of nuts (not shown) which are disposed on opposite ends of the bolts. When the valve assembly 10 is assembled between a pair of flanges, the portion of the elastomeric seat 92 generally adjacent the end 96 or 98 thereof, is sized to sealingly engage the end face of one of the flanges.

A valve assembly of the type described above was described in detail in the applicant's co-pending application entitled "Valve Assembly with Insertable Valve Unit", Serial No. 763,644, filed Sept. 30, 1968, now U.S. Pat. No. 3,531,081, issued Sept. 29, 1970. The operation, the detailed construction and the advantages of such a valve assembly, having an insertable valve unit, were described in detail in the above referred to application, and therefore no further description is required herein.

The elastomeric seat 92 is molded in the valve body 52, having the disc 74 and the second and the third valve stems 78 and 86 disposed therein, to provide a unitary structure, which can be inserted lengthwise into the housing 16 of the housing unit 12. The method and apparatus for molding the elastomeric seat 92 in the valve body 52 will be described in detail below.

Figure 6:
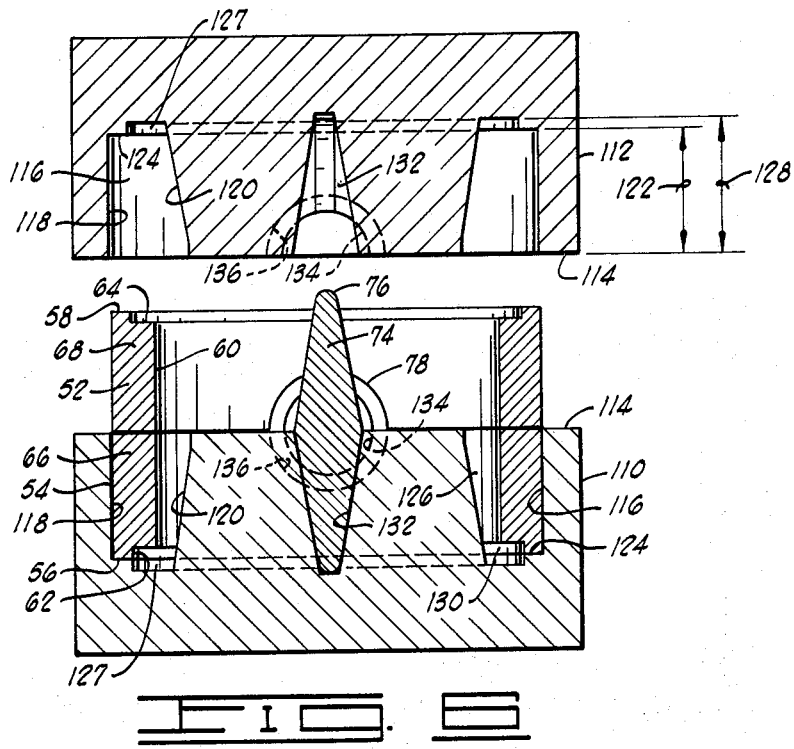
FIG. 6 is an exploded, sectional view showing the first and the second mold section of FIG. 4, with the valve body and the valve member of FIG. 1 assembled in the first mold section.

Referring more particularly to the apparatus and method for molding the elastomeric seat 92 in the valve body 52, the body components 66 and 68 of the valve body 52 are placed in an assembled position about the disc 74, having the second and third valve stems 78 and 86 formed thereon, and a portion of the unit is placed in a first mold section 110, as shown in FIG. 6. A second mold section 112 is placed over the remaining portions of the valve body 52 and disc 74.

The first and second mold sections 110 and 112 are shaped to cooperate with the valve body 52 and the disc 74 such that in an assembled position, a space is defined therebetween, the space corresponding to the volumetric area to be occupied by the elastomeric seat 92, or in other words the space defines the limits of the seat 92.

In a preferred form, the first and the second mold sections 110 and 112 are constructed similar and each mold section 110 and 112 includes a mating surface 114 formed thereon. In an assembled relationship, as shown in FIG. 4, the second mold section 112 is disposed adjacent the first mold section 110, such that the mating surfaces 114 of the mold sections 110 and 112 matingly abut, the first and second mold sections 110 and 112 thereby combining to form a completed mold unit.

Each mold section 110 and 112 includes a valve body cavity 116 formed in a portion of the mating surface 114 of the respective mold section 110 or 112. Each body cavity 116 has an outer periphery 118 and an inner periphery 120.

Figure 4:
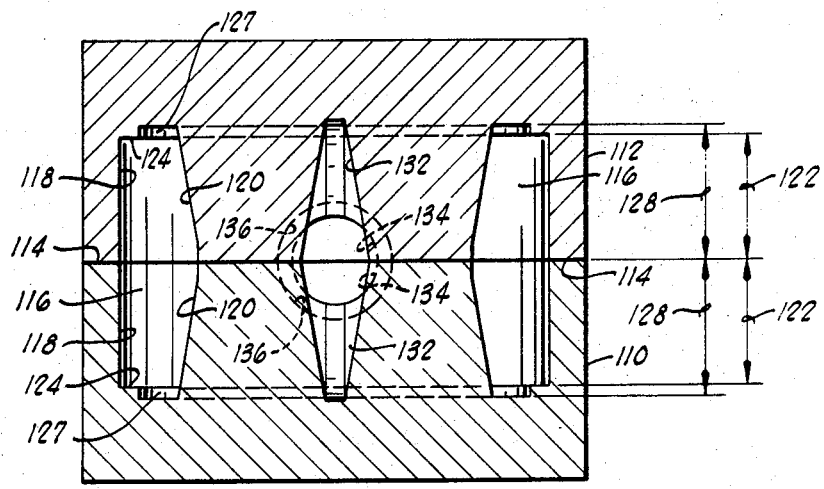
FIG. 4 is a sectional view showing a first and a second mold section in an assembled relationship.

As shown more clearly in FIG. 4, each body cavity 116 is formed in the respective mold section 110 or 112, and extends a distance 122 therein, thereby forming a circumferentially shaped surface 124 about each mold section 110 and 112. Each body cavity 116, and more particularly the outer periphery 118 of each body cavity 116, is sized to slidingly receive a portion of the valve body 52, which in the assembled position is disposed therein. In the assembled position, a portion of the valve body 52 is disposed in each body cavity 116 to a position wherein the end face 56 of the valve body 52 abuts the surface 124 of one of the mold sections 110 or 112 and the end face 58 of the valve body 52 abuts the surface 124 of the opposite mold section 110 or 112.

The diameter formed by the inner periphery 120 of each mold section 110 and 112 is less than the diameter of the bore 60 through the valve body 52. Thus, in the assembled position as shown in FIG. 6, the inner periphery 120 of each mold section 110 and 112 cooperates with a portion of the valve body 52 to define a space 126 therebetween. The space 126 is shaped and disposed to define the limits of a portion of the valve seat 92 which is to be formed in the valve body 52, and more particularly the inner periphery 120 of the body cavities 116 corresponds to the inner periphery 94 of the elastomeric seat 92.

Figure 5:
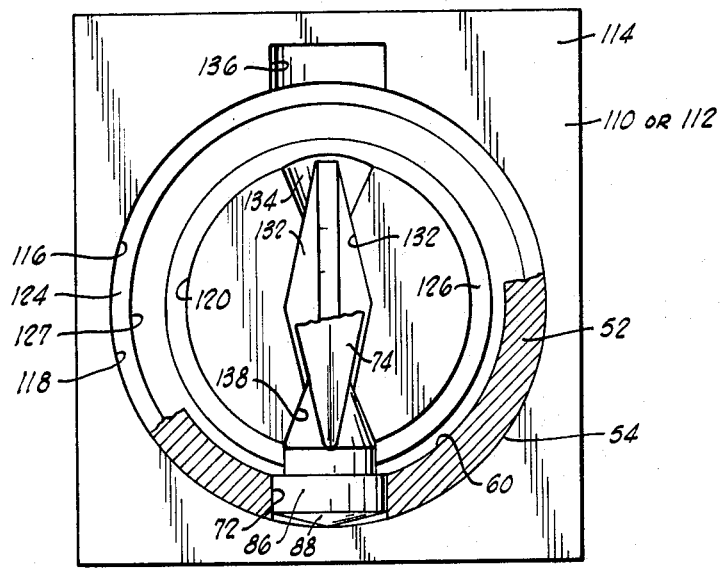
FIG 5 is a top, elevational view of a typical mold section, including a fragmentary view of the valve body and the valve member of FIG. 1 assembled therein.

As shown in FIGS. 4, 5 and 6, an end seal cavity 127 is formed in a portion of the surface 124 of each mold section 110 and 112, extending to a depth 128 from the respective mating surface 114 of each mold section 110 and 112. In the assembled position as partially shown in FIGS. 5 and 6, each end seal cavity 127 is sized to cooperate with a portion of the valve body 52, particularly the respective end 56 or 58 and the respective counterbore 62 or 64 thereof, to define a space 130 therebetween. The spaces 130 are sized and shaped to define the limits of the elastomeric seat 92 adjacent the ends 96 and 98 thereof.

Each mold section 110 and 112 also includes a valve member cavity 132 formed in a portion of the surface 114 of the respective mold section 110 or 112. Each valve member cavity 132 is shaped to receive a portion of the disc 74, and to secure the disc 74 in substantially an open position, that is a position where the disc valve member is in line with the bore 60 through the valve body 52. In the assembled position, the valve member cavities 132 of the mold sections 110 and 112 cooperate to encompass the disc valve member 74.

As shown more clearly in FIG. 5, each mold section 110 and 112 also includes an upper stem cavity 134 which is shaped to receive a portion of the second valve stem 78. In the assembled position, the upper stem cavities 134 cooperate to encompass a portion of the second valve stem 78. The upper stem cavities 134 each include a cavity portion 136, which is sized and shaped to receive a portion of the uppermost end 80 of the second valve stem 78. In the assembled position, the cavity portions 136 cooperate to encompass the uppermost end 80.

Each mold section 110 and 112 also includes a lower stem cavity 138 which is shaped to receive a portion of the third valve stem 86. In the assembled position, the lower stem cavities 138 cooperate to encompass a portion of the third valve stem 86.

It is apparent from the foregoing and from FIGS. 5 and 6, that the valve body 52 supports a portion of each valve stem 78 and 86 when valve unit 14 is assembled between the first and the second mold sections 110 and 112, respectively. The valve body 52 thus cooperates with the stem cavities 134 and 138 to support the valve stems 78 and 86 in an assembled position.

As indicated in FIG. 5, the portion of the second valve stem 78 generally adjacent the surfaces 100 and 102 of the seat 92 (shown in FIG. 1) is disposed in a portion of the space 126 of the body cavity 116 in the first mold section 110, and a portion of the third valve stem 86 generally adjacent the surfaces 104 and 106 of the seat 92 (shown in FIG. 1) is also disposed in a portion of the space 126 of the body cavity 116 in the first mold section 110. When the second mold section 112 is assembled adjacent the first mold section 110, a portion of the second valve stem 78 generally adjacent the surfaces 100 and 102 of the seat 92 (shown in FIG. 1) will be disposed in a portion of the space 126 of the body cavity 116 in the second mold section 112, and a portion of the third valve stem 86 generally adjacent the surfaces 104 and 106 of the seat 92 (shown in FIG. 1) will be disposed in a portion of the space 126 of the body cavity 116 of the second mold section 112. It is apparent from the foregoing that in the assembled position of the mold section 110 and 112, the spaces 126 formed by the body cavities 116 cooperate to surround a portion of the second and third valve stems 78 and 86 and to define the limits the seat 92 and the stem seals.

OPERATION OF FIGS. 1 THROUGH 6

The mold apparatus described in detail before is utilized to cooperate with the valve body 52 and the disc valve member 74, having the second and third valve stems 78 and 86 formed thereon, such that the elastomeric seat 92 is formed in the valve body 52 with the disc valve member 74 and the second and third valve stems 78 and 86 in place.

Initially, the surfaces of the valve body 52 to which the seat 92 is to be bonded, as described before, are treated with a bonding agent to facilitate the bonding of the seat 92 to the valve body 52. Bonding agents and the application of such agents are well known in the art, and no further description is required herein.

In molding the elastomeric seat 92 in the valve body 52, one of the body components, for example as shown in FIG. 6, the body component 66 is initially positioned in the body cavity 116 of the first mold section 110, to a position wherein the end face 56 thereof abuts the surface 124. It is apparent that in this position, the walls formed by the upper and lower aperture portions 70 and 72 of the body component 66 will be facing in the same direction as the mating surface 114 of the first mold section 110. In a preferred form and as shown in FIG. 6, the body cavity 116 in the first mold section 110 is sized to encompass the outer periphery 54 of the body component 66, such that in the assembled position the end of the valve body 52 opposite the end 56 thereof is substantially coplanar with the surface 114 of the first mold section 110.

As indicated in FIGS. 5 and 6, the disc valve member 74, having the second and third valve stems 78 and 86 formed thereon, is oriented in the open position and placed in position in the body component 66 of the valve body 52 and in the first mold section 110. In this position, a portion of the disc valve member 74 is disposed in the valve member cavity 132 of the lower mold section 110. It should be noted, that the surfaces of the mold sections 110 and 112 and the valve stems 78 and 86 are treated with a substance to prevent the bonding of the resilient material thereto, and that, in one form, it may be desirable to treat the disc 74 and portions of the valve body 52 in a like manner. Such substances and the application of such substances are well known in the art.

The body component 68 of the valve body 52 is then placed in an assembled relationship with respect to the body component 66 and the disc valve member 74. More particularly, the body component 68 is placed in position with respect to the body component 66 such that the upper aperture portions 70 of the body components 66 and 68 encompass a portion of the second valve stem 78, and the lower aperture portions 72 of the body components 66 and 68 encompass a portion of the third valve stem 86.

The second mold section 112 is then placed in an assembled position with respect to the valve body 52 and the disc valve member 74. In this position the mating surface 114 of the second mold section 112 will matingly abut the surface 114 of the first mold section 110, and the body component 68 will be disposed in the body cavity 116 of the second mold section 112, to a position wherein the end face 58 of the body component 68 abuts the surface 124 of the second mold section 112.

It should also be noted, that the remaining portion of the disc 74, that is the portion of the disc 74 which is not disposed in the valve member cavity 132 of the first mold section 110, will be disposed in the valve member cavity 132 of the second mold section 112. The valve member cavities 132 thus encompass the disc 74 and secure the disc 74 in an open position during the molding operation, thereby preventing movement thereof, which might result in a deformation of the second and the third valve stems 78 and 86.

It is apparent from the foregoing, that the various cavities in the first mold section 110 are sized and shaped to cooperate with the various cavities in the second mold sections 112, such that when the second mold section 112 is placed in an assembled relationship to the first mold section 110, the various cavities in the mold sections 110 and 112 cooperate to encompass the valve body 52 having the disc valve member 74 and the second and the third valve stems 78 and 86 assembled therein.

After the second and the first mold sections 112 and 110 have been placed in an assembled relationship, the mold sections 110 and 112 are secured in position. The apparatus, methods and the manner of securing separate mold sections in an assembled relationship are various, and are well known in the art, and any suitable manner of securing the mold sections 110 and 112 in an assembled relationship may be utilized in the present invention.

It should also be noted that either the first mold section 110 or the second mold section 112 or both mold sections 110 and 112 are provided with channels (not shown) interconnecting the spaces 126 and 130 to an external elastomeric injection supply and an air bleed connection. The method and apparatus utilized to inject elastomeric material into spaces or cavities of an enclosed mold are well known in the art, and any suitable method of injecting such elastomeric material may be utilized in the present method.

A predetermined amount of uncured elastomeric material is then injected into the spaces 126 and 130. The elastomeric material is then cured, in a manner well known in the art, to complete the forming of the valve seat 92.

The mold sections 110 and 112 are then separated, and the valve body 52, having the disc valve member 74 rotatably supported therein, is removed from the mold sections 110 and 112.

The elastomeric seat 92 is thus formed in the valve body 52, in such a manner that the body components 66 and 68, the disc 74 and the stems 78 and 86 combine with the elastomeric seat 92 to provide a unitary structure. Further, since the disc valve member 74 is in place during the molding operation, the surfaces 100, 102, 104 and 106 are formed about the second and third valve stems 78 and 86, respectively, thereby assuring the sealing integrity of the resilient seat 92 about the second and third valve stems 78 and 86. It should also be noted, that since the disc 74 and a portion of the stems 78 and 86 are disposed in cavities in the mold sections 110 and 112, and further since those cavities are positively located with respect to the body cavities 116, that the inner periphery of the seat 92, defined by the inner periphery 120 of the body cavities 116, is consistently and positively oriented with respect to the disc 74, thereby assuring the sealing cooperation therebetween.

EMBODIMENT OF FIGS. 7 THROUGH 10

The apparatus shown in FIGS. 9 and 10 is adapted to cooperate with a valve body, having a disc valve member rotatably supported therein, such that an elastomeric seat may be molded in the valve body, in a manner similar to that described before. More particularly the apparatus shown in FIGS. 9 and 10, is adapted to mold an elastomeric seat in a valve assembly 200, shown in FIGS. 7 and 8.

The valve assembly 200 basically comprises a housing unit 202 and a valve unit 204. The housing unit 202 includes a housing 206, having opposite ends 208 and 210, and a bore 212 extending therethrough. An aperture 216 extends transversely through the housing 206, intersecting the bore 212 therethrough.

A first valve stem 222 is journaled in the housing 206, and extends transversely through the aperture 216. A rectangularly shaped end portion 224 is formed on the lowermost end portion of the first valve stem 222. The rectangularly shaped end 224 is sized and shaped to provide the interconnection between the first valve stem 222 and a second valve stem.

The uppermost end portion 228 of the first valve stem 222 is adapted to receive and cooperate with a valve handle or other suitable operator (not shown) for turning the valve stem 222, and thereby rotating a valve member from a fully open to a fully closed position. As well known in the art, various forms of valve handles and connections may be utilized and no further description is required herein.

A circumferential groove 230 is formed in a portion of the upper end portion 228 of the first valve stem 222, and a retaining ring 232 is disposed in the groove 230. The retaining ring 232 is sized and disposed to engage a portion of the housing 206, thereby limiting the downward movement of the first valve stem 222 in the housing 206.

Another groove 234 is formed about the first valve stem 222 generally between the groove 230 and the rectangularly shaped end 224. An O-ring seal member 236 is disposed in the groove 234, and is sized and shaped to sealingly engage the housing 206, thereby forming a fluid tight seal between the housing 206 and the first valve stem 222.

The valve unit 204 includes a valve body 250, having an outer periphery 252 sized to slidingly fit in the bore 212 of the housing 206, and opposite end faces 254 and 256. A bore 258 extends through the valve body 250 intersecting the end faces 254 and 256. A counterbore 260 is formed in the end face 254 of the valve body 250, and a counterbore 262 is formed in the end face 256 of the valve body 250.

The valve body 250 is split along a vertical centerline, thereby providing a pair of side body components 264 and 266. The side body components 264 and 266 are adapted to receive and cooperate with a disc valve member having the valve stems formed thereon in a manner similar to that described before with respect to the valve assembly 10.

Each body component 264 and 266 includes a portion of an upper aperture 270 formed in the end face thereof opposite the end face 254 or 256 thereof. Each upper aperture portion 270 is sized such that in the assembled position, as shown in FIGS. 7 and 8, the upper aperture portions 270 cooperate to encompass a portion of a second valve stem. Each body component 264 and 266 also includes a lower aperture portion 272 formed in the end face thereof opposite the end face 254 or 256 thereof. Each lower aperture portion 272 is sized such that in the assembled position, as shown in FIGS. 7 and 8, the lower aperture portions 272 cooperate to encompass portions of the third valve stem.

A disc valve member 274, having an outer periphery 276, is rotatably disposed in the bore 224 of the valve body 250. As shown in FIG. 7, the disc 274 is of the off-set type, that is when the disc 274 has been rotated to the closed position, the disc 274 lies in a plane which is off-set from the turning axis of the valve assembly 200.

A second valve stem 278 is formed on a portion of the disc 274, and extends generally upwardly therefrom through the upper aperture formed by the aperture portions 270 in the valve body 250, terminating with an uppermost end 280. A rectangularly shaped recess 282 is formed in a portion of the uppermost end 280 of the second valve stem 278. The recess 282 is sized to interconnectingly receive the rectangularly shaped end 224 of the first valve stem 222, thereby providing the interconnection therebetween.

A portion 283 of the second valve stem 278 is of a smaller diameter than the remaining portion thereof, thereby providing a downwardly facing surface 284 about the second valve stem 278. An O-ring 285 is disposed about the portion 283 of the second valve stem 278 generally adjacent the downwardly facing surface 284. The O-ring 285 is sized and disposed to sealingly engage an adjacent portion of the wall formed by the upper apertures 270, thereby providing a secondary seal between the second valve stem 278 and the valve body 250.

A third valve stem 286 is formed on the disc 274 and extends generally downwardly therefrom through the aperture formed by the lower aperture portions 272 of the valve body 250. In a preferred form and as shown in FIGS. 7 and 8, the second and third valve stems 278 and 286 are formed integrally with the disc 274, and are radially aligned.

A portion 287 of the third valve stem 286 is of a smaller diameter than the remaining portion thereof, thereby providing an upwardly facing surface 288 about the third valve stem 286. An O-ring 290 is disposed about the portion 287 of the third valve stem 286, generally adjacent the upwardly facing surface 288. The O-ring 290 is sized and disposed to sealingly engage an adjacent portion of the wall formed by the lower aperture 272, thereby providing a secondary seal between the third valve stem 286 and the valve body 250.

An elastomeric seat 292, having an inner periphery 294 and opposite ends 296 and 298 is molded to the walls of the valve body 250 formed by the bore 258 therethrough, and to the walls formed by the counterbores 260 and 262, and thus forms the seat for the valve unit 214. The method of molding the seat 292 in the valve body 250 will be described in greater detail below.

As shown in FIGS. 7 and 8, an annular bead 300 is formed on a portion of the end 296 of the seat 292, and extends axially outwardly therefrom, beyond the end 254 of the valve body 250. A second annular bead 302 is formed on a portion of the end 298 of the seat 294, and extends axially outwardly therefrom beyond the end 256 of the valve body 250.

Annular surfaces 306 and 308 are formed in a portion of the seat 292. The surfaces 306 and 308 are sized and disposed to sealingly engage a portion of the second and third valve stems 278 and 286, respectively.

A recess 310 is formed in a portion of the end 254, adjacent and intersecting a portion of the outer periphery 252 of the valve body 250. An elastomeric seal member 312 is bonded in the recess 310, and is shaped to have a portion thereof which extends axially beyond the end face 254 of the valve body 250. A recess 314 is formed in a portion of the end face 256, adjacent and intersecting a portion of the outer periphery 252 of the valve body 250. An elastomeric seal member 316 is bonded in the recess 314, and is shaped to have a portion thereof which extends axially beyond the end face 256 of the valve body 250.

As shown more clearly in FIG. 9, a pair of annular beads 320 and 322 are formed about a portion of the inner periphery 294 of the seat 292. Each bead 320 and 322 extends a distance axially inwardly from the inner periphery 294 of the seat 292, and each bead 320 and 322 is sized and disposed to sealingly engage the disc 274, in one position thereof. More particularly, when the disc 274 has been rotated to the closed position, as shown in FIG. 7, the disc 274 will sealingly engage the bead 322, and when the disc 274 has been rotated to the closed position, 180 degrees from the position shown in FIG. 7, the disc 274 will sealingly engage the bead 320. Thus, each seal bead 320 and 322 functions independently to provide a sealing engagement with the disc 274, thereby providing what may be referred to as a "spare seal" in the valve assembly 200, capable of providing the sealing function should either of the seal beads 320 or 322 become worn or damaged.

As shown more clearly in FIG. 9, a pair of recesses 330 and 332 are formed in the end face of each body component 264 and 266, opposite the end face 254 or 256, respectively, thereof. A portion 334 of the seat 292 is bonded to the walls formed by the recesses 330 and 332, the portion 334 thereby providing the sealing integrity between the body components 264 and 266.

Referring more particularly to the apparatus and method for molding the elastomeric seat 292 in the valve body 250, the body components 264 and 266 are placed in an assembled position about the disc 274, having the second and third valve stems 278 and 286 formed thereon, and the unit is placed in an assembled position between the first and the second mold section 110a and 112a.

The mold sections 110a and 112a are constructed similar to the mold sections 110 and 112, described before, and the mold sections 110a and 112a are shaped to cooperate with the valve body 250 and the disc 274, such that, in the assembled position, a space is defined therebetween, the space corresponding to the volumetric area to be occupied by the elastomeric seat 292, or in other words the space defines the limits of the seat 292.

As shown in FIGS. 9 and 10, the valve member cavities 132a in each mold section 110a and 112a are not shaped to retainingly secure the disc 274 in the open position, but rather the cavities 132a merely provide an opening in the mold sections 110a and 112a, in which the disc 274 is disposed. This particular type of construction may be more desirable in some applications, and may result in a reduced cost for the mold sections 110a and 112a.

Each body cavity 116a is constructed similar to the body cavities 116, described before. As shown more clearly in FIG. 9, an annular recess 370 is formed by the inner periphery 120a of each mold section 110a and 112a. The recess 370 modifies the shape of the space 126a, and more particularly, each recess 370 provides the form for one of the beads 320 or 322 which are formed on the seat 292.

A recess 372 is formed in a portion of the surface 124a of each mold section 110a and 112a, generally adjacent the outer periphery 118a in the respective mold section 110a or 112a. The recesses 372 cooperate with a portion of the valve body 250, particularly the respective recesses 310 and 314 therein, to define a space 320 therebetween. One of the spaces 320 is sized and shaped to define the limits of the seal member 312 and the other space 320 is sized and shaped to define the limits of the seal member 316.

A recess 374 is formed in a portion of the surface 124a of each mold section 110a and 112a. The recesses 374 modify the shape of the spaces 130a, and more particularly one of the recesses 372 provides the form for the annular bead 300 and the other recess 372 provides the form for the annular bead 302 on the seat 292.

As shown in FIGS. 9 and 10, the space 126a is also modified by the recesses 330 and 332 in the body 250. The space 126a is therefore shaped to form the portion 334 of the seat 292.

OPERATION OF FIGS. 7 THROUGH 10

The first and second mold sections 110a and 112a cooperate with the valve body 250 and the disc 274, having the stems 278 and 286 formed thereon, such that the elastomeric seat 292 is formed in the valve body 250 in a manner similar to that described before with respect to the mold sections 110 and 112.

The surfaces of the mold sections 110a and 112a and the surfaces of the valve stems 278 and 286 are treated with a substance to prevent the bonding of the elastomeric material thereto, and the surfaces of the valve body 250, to which the seat 292 is to be bonded, are treated with a bonding agent. The valve body 250 is then assembled between the mold sections 110a and 112a. It should be noted O-rings 285 and 290 are assembled about the valve stems 278 and 286, respectively, before the mold sections 110a and 112a are assembled about the valve body 250.

After the mold sections 110a and 112a are secured in an assembled position as shown in FIG. 10, a predetermined amount of uncured elastomeric material, preferably a rubber or rubber composition, is forced into the spaces 126a, 130a and 320, and the elastomeric material is then cured. It has been found that the curing temperatures in most applications does not damage the O-rings 285 and 290. The O-rings 285 and 290 thus provide a secondary seal about the second and the third valve stems 278 and 286, thereby compensating for any shrinkage of the elastomeric material away from the stems 278 and 286 during the curing period.

It is apparent from the foregoing that the mold sections, described before, are shaped to cooperate with a valve body, having the valve member and stems rotatably supported therein, such that an elastomeric seat can be molded in the valve body with the disc and stems in place. The method of molding an elastomeric seat and stem seals in a valve body is therefore accomplished in a more efficient and economic manner.

Changes may be made in the construction and arrangement of the parts or the elements of the various embodiments as disclosed herein without departing from the spirit and scope of the invention as defined in the following claims.

What is claimed is:

1. Apparatus for molding an elastometic seat and stem seal in a valve body having a valve member rotatably supported therein by at least one stem journaled in a mating aperture in the valve body, the apparatus comprising:

a first mold section having an annular body cavity formed therein, the body cavity having an outer periphery and an inner periphery, the outer periphery of the body cavity sized to receive the valve body having the valve member and stem supported therein, the inner periphery of the body cavity forming a wall in the first mold section shaped to cooperate with a portion of the valve body to define a space therebetween, a portion of the stem being disposed in the space between the valve body and the first mold section wall; and a second mold section having an annular body cavity formed therein, the body cavity in the second mold section having an outer periphery and an inner periphery, the outer periphery of the body cavity in the second mold section sized to receive the valve body, the body cavity in the second mold section being sized to cooperate with the body cavity of the first mold section to encompass a portion of the valve body, the inner periphery of the body cavity in the second mold section forming a wall in the second mold section shaped to cooperate with a portion of the valve body to define a space therebetween, a portion of the stem being disposed in the space between the valve body and the second mold section, the last mentioned space being shaped and disposed to cooperate with the first mentioned space to surround a portion of the valve stem and to define the limits of the valve seat and stem seal; and cavity means formed in the first mold section and the second mold section to accommodate the valve member and a portion of the valve stem in an assembled position of the first mold section and the second mold section wherein the body cavities in the first mold section and the second mold section cooperatingly encompass a portion of the valve body.

2. The apparatus of claim 1 wherein the cavity means includes a valve member cavity formed in the first mold section shaped to receive a portion of a valve member to be disposed therein.

3. The apparatus of claim 2 wherein the cavity means includes a valve member cavity formed in the second mold section shaped to receive a portion of the valve member, the valve member cavity in the second mold section being shaped and disposed to cooperate with the valve member cavity in the first mold section to substantially encompass the valve member.

4. The apparatus of claim 1 wherein the cavity means includes a valve member cavity formed in the first mold section shaped to receive a portion of the valve member to be disposed therein and to secure the valve member in an open position thereof.

5. The apparatus of claim 4 wherein the cavity means includes a valve member cavity formed in the second mold section shaped to receive a portion of the valve member and to secure the valve member in an open position.

6. The apparatus of claim 5 wherein the valve member cavity in the second mold section is defined further as being shaped and disposed to cooperate with the valve member cavity in the first mold section to substantially encompass the valve member.

7. The apparatus of claim 1 wherein the body cavity in the first mold section is further defined to include an end seal cavity formed in a portion of the body cavity, the end seal cavity being shaped to cooperate with a portion of the valve body to define an end seal space therebetween, the end seal space being shaped to define the limits of a seal member formed on one end of the valve body.

8. The apparatus of claim 1 wherein the body cavity in the second mold section further defined to include an end seal cavity formed in a portion of the body cavity, the end seal cavity being shaped to cooperate with a portion of the valve body to define an end seal space therebetween, the end seal space being shaped to define the limits of a seal member formed on one end of the valve body.

9. Apparatus for molding an elastomeric seat and stem seal in a valve body having a valve member rotatably supported therein by at least one valve stem journaled in a mating aperture in the valve body, the valve body being split along a centerline thereof, thereby forming a first and a second body component shaped to be assembled about the valve member to form the valve body, the apparatus comprising:

a first mold section having an annular body cavity formed therein, the body cavity sized and shaped to receive the first body component having the valve member and stem supported therein, and to encompass a portion of the first body component, the inner periphery of the body cavity forming wall in the first mold section shaped to cooperate with a portion of the first body component to define a space therebetween, a portion of the stem being disposed in the space between the first mold section wall;

a second mold section having an annular body cavity formed therein, the body cavity in the second mold section having an outer periphery and an inner periphery, the body cavity sized to receive the second body component and to encompass a portion of the second body component, the inner periphery of the body cavity in the second mold section forming a wall in the second mold section shaped to cooperate with a portion of the second body component to define a space therebetween, a portion of the stem being disposed in the space between the valve body and the second mold section, the last mentioned space being shaped and disposed to cooperate with the first mentioned space to surround a portion of the valve stem and to define the limits of the valve seat and stem seal; and cavity means formed in the first mold section and the second mold section to accommodate the valve member and a portion of the valve stem in an assembled position of the first mold section and the second mold section wherein the body cavities in the first mold section and the second mold section cooperatingly encompass a portion of the valve body.

10. The apparatus of claim 9 wherein the body cavity in the second mold section is defined further as being shaped to cooperate with the body cavity in the first mold section to substantially encompass the valve body.

* * * * *